Oct. 29, 1929.  H. A. FRACKELTON  1,733,590
TRUCK FOR RAILROAD VEHICLES
Filed Sept. 28, 1928
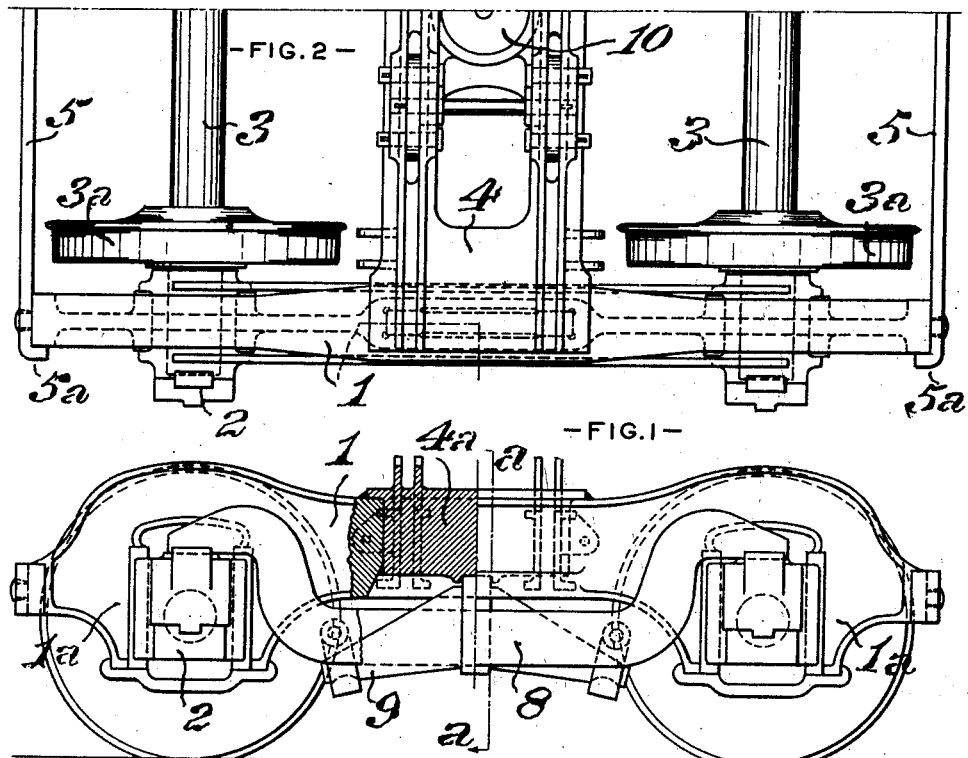
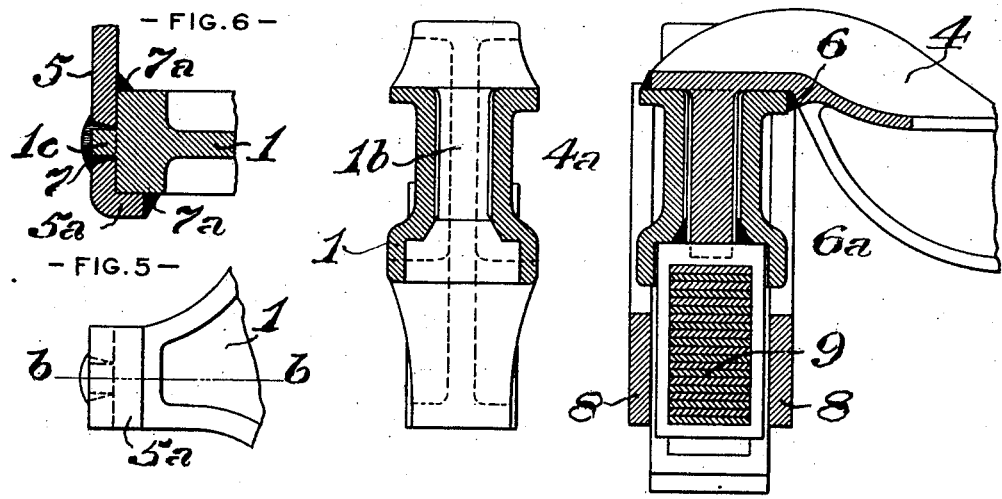

Patented Oct. 29, 1929

1,733,590

UNITED STATES PATENT OFFICE

HENRY A. FRACKELTON, OF SCHENECTADY, NEW YORK

TRUCK FOR RAILROAD VEHICLES

Application filed September 28, 1928. Serial No. 309,051.

This invention relates, generally, to trucks for railroad vehicles of various descriptions and its object is to provide a truck of simple, strong and inexpensive construction in which the employment of bolts for connecting the constituent members is dispensed with and the resultant advantages, as to structure and maintenance, attained.

The improvement claimed is hereinafter fully set forth.

In the accompanying drawing: Figure 1 is a side view partly in section, of a truck illustrating an embodiment of the invention; Fig. 2, a half plan or top view thereof; Fig. 3, a partial transverse section, on an enlarged scale, on the line $a\ a$ of Fig. 1; Fig. 4, a similar section, through one of the side members, before the attachment of the transom; Fig. 5, a partial view, in elevation of an end cross tie, and; Fig. 6, a horizontal section, on the line $b\ b$ of Fig. 5.

In the practice of the invention, referring descriptively to the specific embodiment thereof which is herein exemplified, the truck frame comprises the following members, to wit: two counterpart side members, 1, 1, each of which has formed, integrally with it, pairs of pedestal jaws, $1^a$, in which are fitted the axle boxes, 2, in which are mounted the axles, 3, upon which the wheels, $3^a$ are secured; a transom, 4, formed of two parallel transversely extending portions, united at their ends by integral connections and having longitudinally extending rectangular tongues, $4^a$, formed on the ends of the transom; and cross ties, 5, connecting the opposite side members, at the ends thereof.

The ends of the transom are fitted in the recesses, $1^b$, of the side members, as shown in Fig. 4, and are secured thereto, at top and bottom, by welding material, 6, $6^a$, being applied as in ordinary practice. The end cross ties 5, are fitted on short tongues, $1^c$, projecting from the side members, and have lips, $5^a$, on their ends, abutting on the side members. They are secured to the side members by being welded to the ends and tongues thereof, welding material, 7, $7^a$, being applied in the usual manner.

The axle boxes of each side frame are connected by equalizers, 8, to which the weight of the load supported is transmitted by springs, 9. A centre plate, 10, of any suitable and preferred construction is connected to the transom, 4, or to a swing bolster connected thereto with the capacity of relative lateral motion.

It will be seen that the truck herein set forth is of simple, strong, and compact construction; that all frame connecting bolts are dispensed with; and that it is applicable to any of the various classes of railroad vehicles of present practice.

The invention claimed and desired to be secured by Letters Patent is:

1. In a fabricated truck frame for railroad vehicles, the combination of two side members, each having depending pedestal jaws and a longitudinally extending recess opening through the top wall thereof; and a transom superimposed upon the tops of the side members and having tongues depending from its ends, fitting in the recesses of the side members.

2. In a fabricated truck frame for railroad vehicles, the combination of two side members, each having depending pedestal jaws and a longitudinally extending recess opening through the top wall thereof; and a transom superimposed upon the tops of the side members and having tongues depending from its ends, fitting in the recesses of the side members and welded thereto.

3. In a fabricated truck frame for railroad vehicles, the combination of two side members, each having depending pedestal jaws, a longitudinally extending recess opening through the top wall thereof and end tongues; a transom superimposed upon the tops of the side members and having tongues depending from its ends, fitting in the recesses of the side members; and cross ties, fitting on the end tongues of the side members and having right angular lips on their ends, abutting against said members.

4. In a fabricated truck frame for railroad vehicles, the combination of two side members, each having depending pedestal jaws, a longitudinally extending recess opening through the top wall thereof and end tongues;

a transom superimposed upon the tops of the side members and having tongues depending from its ends, fitted in the recesses of the side members, and welded thereto; and cross ties, fitting on the end tongues of the side members, and having right angular lips on their ends, abutting against said members, and welded to said members.

5. A transverse connecting transom for railroad vehicle trucks, comprising two parallel portions, connected at their ends integrally by end plates adapted for superposition upon truck side members provided with longitudinal recesses opening through the top walls thereof, and tongues depending from said end plates adapted to fit in said recesses.

HENRY A. FRACKELTON.